Oct. 8, 1963 W. A. RICE 3,106,058
PROPULSION SYSTEM
Original Filed July 18, 1958
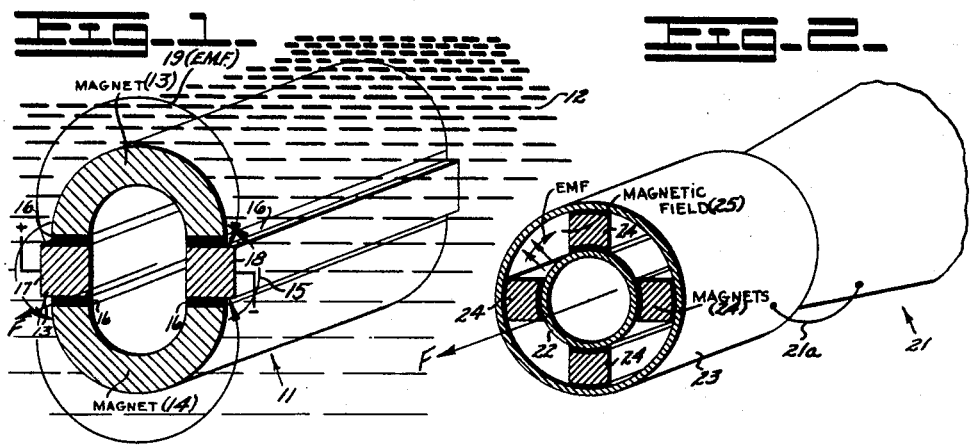
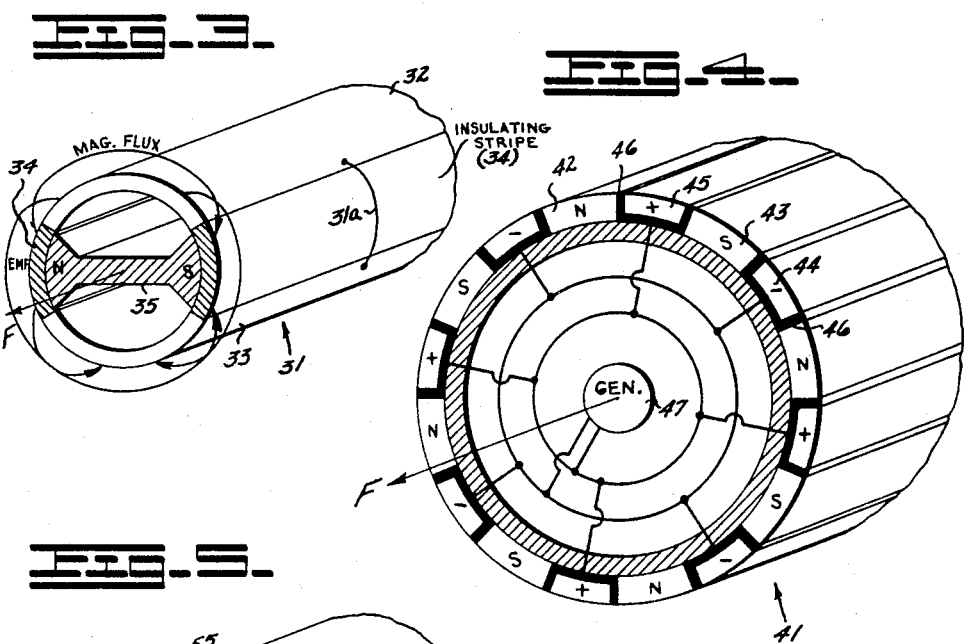
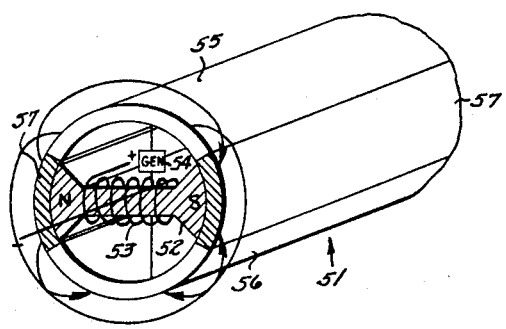
INVENTOR.
WARREN A. RICE
BY
Miller Morriss & Pappas
ATTORNEYS

United States Patent Office 3,106,058
Patented Oct. 8, 1963

3,106,058
PROPULSION SYSTEM
Warren A. Rice, Dexter, Mich., assignor of one-half to Carl E. Grebe, Midland, Mich.
Original application July 18, 1958, Ser. No. 749,547, now Patent No. 2,997,013, dated Aug. 22, 1961. Divided and this application Mar. 29, 1961, Ser. No. 99,176
5 Claims. (Cl. 60—35.5)

The present invention relates to a propulsion system for vessels traveling in an ionic media and more particularly relates to drive systems wherein the outer surface of the vessel constitutes an electrolytic cell employing the ambient ionic media as an operating electrolyte. Still more particularly the present invention relates to a vessel propulsion drive requiring no moving parts and wherein the thrust is accomplished electromagnetically to promote laminar fluid flow at the interphase between vessel and media. The present application is a divisional application of application Serial Number 749,547 filed on July 18, 1958, now U.S. Letters Patent 2,997,913 issued on August 22, 1961 and entitled, "Propulsion System."

The instant drive or propulsion system is applicable to all vessels, such as ships, submarines, torpedoes, and the like traveling in salt water. Insofar as can be experimentally shown the device also has utility as a space drive system for imparting thrust to a vessel traveling in an ionic atmosphere, for example, space.

It has long been known that when an electrical current is passed through a magnetic field that a thrust is accomplished which obeys the "Left Hand Rule" and which is of a magnitude directly proportional to the magnetic field strength and the current density. Such electrical principles are applied in electromagnetic pumps for the handling, for example, of liquid material which is an electrolyte. Such a device is illustrated in United States Letters Patent 2,786,416 issued to Alan Stephen Fenemore on March 26, 1957.

Similarly, particle acceleration in vacuum tubes has demonstrated the concept of thrust obtained by intersecting lines of magnetic flux with a suitable current flow in an ionic atmosphere. Reference is made to United States Letters Patent 2,497,891 to Donald W. Kerst, issued on February 21, 1950.

However, until the instant invention there was no appreciation of the application of the known principles to the problem of propelling a vessel in an electrolyte and space.

"Ionicmedia" are used herein has reference to the ionized condition of free charge carrying particles; in space it may have reference to the rarified gases in the upper atmosphere of a planet rendered conductive by high temperature heating at high velocity; in some instances the free charge carrying particles may be emitted as for example in gases from the vehicle rendered conductive by high temperature or nuclear radiation.

It has now been found that the structural members of the vessel itself can be utilized to generate a thrust of sufficient magnitude to be useful. It has also been found that the flow obtained at the interphase between hull and fluid media is substantially laminar so as to impart an added credit to the concept of vessel propulsion by material reduction in friction.

Thus, the hull itself generates the force to propel the vessel and the hull form imparts direct surface thrust in contrast, for example, to prior art propeller propulsion and its accompanying turbulent flow.

Accordingly one of the objects of the present invention is to provide an electromagnetic drive for vessels moving in an ionic media.

Another object is to provide a propulsion means having its source substantially at the interphase between vessel hull and media.

Still another object is to provide a propulsion means integrated into the hull structure of the vessel to be propelled.

Still another object is to provide a hull surface capable of serving as a cell in an ionic media so as to provide desired electromotive force.

Other objects include the provision of a highly efficient propulsion means eliminating the necessity for intricate mechanical movements extending into the liquid media to require intricate and expensive seal means. These objects include obvious design simplification which can result from the adoption of the present described propulsion means.

In the drawings:

FIGURE 1 is a schematic perspective view of a tube across which is gapped a magnetic flux field and showing an E.M.F. crossing the gap using, for example, sodium chloride in water as the ionic conducting media, and indicating the direction of force generated by the tube.

FIGURE 2 is a perspective schematic view of a tube encasing, for example, the hull or shell of a projectile, vessel, or the like where the E.M.F. is generated by the cell established by the silver hull and the magnesium sleeve and where the magnetic flux lines are available from permanent magnets used as spacers.

FIGURE 3 is a scehmatic view of a device which also utilizes a cell created by structural portions of the hull separated by suitable insulating strips and having a permanent magnet internally oriented so as to establish magnetic flux lines intersectable by the E.M.F. established by the cell in the electrolyte to provide a thrust force in the direction indicated.

FIGURE 4 illustrates a hull structure in schematic cross section indicating a segmentalized external system of alternate north and south magnetic poles with alternating positive and negative plates supplied with an E.M.F. from a suitable generator and being conducted by the electrolyte or ionic media in which the hull is immersed.

FIGURE 5 illustrates in schematic perspective a system in accord with the present invention whereby the hull establishes an electrolytic cell and the magnetic flux density is obtained by the use of a generator served electro magnet.

General Description

In electromagnetic phenomena it has long been known that if a current is passed across a magnetic field a force is set up which generally is dependent upon the flux D, the distance between conductors, and the amperage or current. The general formula may be expressed as:

Thrust in kilograms=$(10.2 \times 10^{-8})$[(Flux density) (gauss) $\times d$(centimeters) $\times$ I(amperes)]

Conversion to pounds of thrust is accomplished by multiplying the thrust in Kilograms by the rough factor of 2.2.

Experimental work based on this data has generally validated this above expression and supplementally has shown that the thrust is a reaction to the movement of the electrolyte through which the current passes. Viewed in a vacuum the thrust may be expressed in terms of ionic drive employing Beta particle emission with the bonus obtained by appreciation of mass. Further, the flow pattern appears "laminar" in nature in contrast to a type of thrust imparted by a driven propeller, the latter being characterized as "turbulent." Peculiarly the laminar flow is substantially independent of hull design, that is, the hull design becomes considerably less critical assuming that the entire hull is used as a drive fixture.

In general a magnetic field is established using components of the vessel as alternate north and south poles. As between these structurally established poles a magnetic flux is established through an ionic media, for example, an ionized atmosphere such as space or an electrolyte such as salt water. An electric current, also emanating from the structural members of the vessel passes through the ionic media cutting the magnetic lines of force. The result is a movement of the electrolyte in obedience to the "Right Hand Rule." The movement is equivalent to the force exerted in accord with the foregoing general formulation and a reaction force thus propels the vessel.

When the above expression is applied in space it can be said that hull members provide the magnetic field and that hull members also serve the function of anode and cathode for current flow in an ionic media. However, in the case of space the electron flow is established by the system and the particle emission comprises Beta particles which appreciate in mass as they approach the speed of light. Thus, it is felt that some correction in value of total thrust should be applied in the instance of an application to space versus the situation existing for propulsion in an electrolyte.

In some instances the source of electromotive force may be cell derived in which instance the hull of the craft, or portions thereof comprise a single cell or a plurality of cells where the latter is advantageous. Where this cell system is desirable permanent magnets establish the required magnetic field.

It will be appreciated that an electric generator within the craft may also supply electromotive force to the anode and cathode members of the structure and provide an electromagnet with current for the establishment of magnetic flux lines of desired magnitude.

Similarly, the scope of the contribution extends to embrace combinations of cell, magnet, and mechanically generated source of electromotive force wherein the magnetic poles and the cathode and anode elements comprise a structural adjunct to the vessel hull. Inasmuch as the current must pass through a magnetic field in an ionic media, a simple form of the device is annular where the annulus is immersible in the ionic media.

*Specific Description*

The invention may be better appreciated by reference to the accompanying drawings. With reference to FIGURE 1, an annular form of enclosure or hull 11 is illustrated. Thus, the hull 11 is tubular in character and is immersed in an ionic media 12, for example salt water or ionic space. Magnets 13 and 14, comprising elements of the hull 11, establish a magnetic field 15 bridging the gap shown. Insulators 16, space the magnets 13 and 14 from closed contact with each other. An anode 17 and cathode 18 are positioned between the magnets 13 and 14. The anodes 17 and cathode 18 are positioned oppositely from each other. When current 19 is caused to pass across the gap through the electrolyte 12 intersecting the magnetic lines of force 15, the electrolyte is caused to move in the direction of the force arrow F propelling the hull 11 in an opposite sense. The required electromotive force is supplied by cell means or from a hull contained source such as a battery or generator.

In FIGURE 2 the cell supplying the requisite electromotive force is made up of hull components. For purposes of illustration a segment 22 of the hull 21 is made up of silver. An annulus 23 made, for example, of magnesium spacedly surrounds the silver segment 22. The space relationship is maintained by magnets 24 leaving gaps through which electrolyte is permitted to flow. The alternate opposite positioning of the magnets provides a magnetic field 25. In an electrolyte, current is caused to flow between the silver and magnesium intersecting the magnetic lines of force and provides a thrust in the direction of the force arrow F.

It will be understood that a suitable external circuit is provided as a means of controlling or regulating current flow within the cell and this circuit is schematically represented by the bus bar connection 21a. An equivalent reactive force moves the hull 21 through salt water, for example. While a silver magnesium cell has been described it will be appreciated that other combinations of anode and cathode chemical cells are well known in the art and are intended to be included in the scope of the present invention. Experimental results in brine has indicated satisfactory performance with the system as described, the E.M.F. being directly proportional to the area provided by the cell plates and the strength of the electrolyte. As the plates 22 and 23 deteriorate they may be replaced.

Refering to FIGURE 3 the hull 31 is longitudinally provided with a stripe like pair of plates 32 and 33 running for a substantial length of the hull 31. These provide an anode and cathode for cell operation in an electrolyte. When the plate 32 is silver and the plate 33 is magnesium, for example, a current is caused to flow as between the plates 32 and 33. Insulating strips or plates 34 electrically separate the plates 32 and 33. A magnet 35 structurally bridges the hull cavity, its poles coinciding with the insulating stripes or plates 34. In this form the magnetic lines of force travel peripherally around the hull 31. As an E.M.F. passes between the plates 32 and 34 they intersect the magnetic lines of force providing an axial thrust to the electrolyte as expressed by the force arrow F. The reactive force moves the vessel. As indicated in FIGURE 2 regulation of current flow in the resulting cell is accomplished by an external circuit as illustrated in FIGURE 3 by the bus bar 31a.

The E.M.F. passing between the plates, while illustrated as the product of a chemical cell may be supplied by a generated E.M.F. from a generator source not shown within the vessel. Similarly the magnet 35 may be of the permanent type or may be of conventional electromagnet construction where the field strength is established by a winding around a suitable core. In a similar way the E.M.F. and magnet fields of all of the structures described may be supplied by a source of generated E.M.F.

Referring to FIGURE 4 a hollow hull 41 is illustrated wherein a plurality of alternating north and south magnetic poles 42 and 43 respectively line the periphery of the hull 41, the lines of force emanating from the magnetic poles providing a peripheral series of magnetic force bridges around the hull 41, immersed for example, in an electrolyte. Intermediate each of the magnetic poles 42 and 43, and completing the schematic annular hull 41 are alternate cathodes 44 and anodes 45. Insulating spacers 46 separate the magnets from conducting the E.M.F. emanating from the electrodes 44 and 45. When a current is fed as between the electrodes 44 and 45 the current passes through the electrolyte media in which hull 41 is immersed and cuts the peripherally bridged lines of magnetic flux to cause a resultant force in a direction as indicated by the force arrow. The resultant reactant force drives the vessel 41. A generator 47 supplies the requisite E.M.F., the generator being located, as shown schematically within the hull of the vessel. As previously indicated a chemical cell may supply the required E.M.F. and the magnets may be of the permanent or electromagnet types. In the vessel 41 as shown in FIGURE 4 it will be appreciated that the thrust is intimately related to the interphase between hull 41 and the ambient ionic media. In this design the laminar flow predominates and studies thus far advanced show maximum thrust substantially at the interphase and diminishing with radial progression outward.

FIGURE 5 shows the hull 51 with a single magnet 52 which is in effect a core served by the winding 53 powered by the generator 54. Anode 55 and cathode 56 comprise electrode means in suitable ionic media to self generate an E.M.F. which cuts the magnetic flux lines moving peripherally about the hull 51. This hull structure illustrates the use of electromagnetic means in combination with a suitable generated E.M.F. Insulation spacers 57 prevent the hull system from "shorting out" in service. As previously described, it will be appreciated that the members 55 and 56 may comprise a suitable chemical cell.

In operation, structures as described have demonstrated unusually excellent propulsion seemingly indicative of minimum hull "drag" at the interphase between hull and ionic media. The flow at the interphase seems to obey laminar principles.

Having thus described my invention other modifications will be immediately apparent to those skilled in the art and such modifications are intended to be included herein limited only by the scope of the hereinafter appended claims.

I claim:

1. In a propulsion system for vessels in an ionic media, the self generating combination comprising: a hull segment serving as an electrode; a separate spaced apart segment also serving as an electrode, said electrodes being made of different metals from each other; magnets interposed between said electrodes and insulated therefrom whereby the E.M.F. generated by cell action between said electrodes transects magnetic lines of force, thereby propelling said segments reactively.

2. In a propulsion system in accord with claim 1 wherein said magnets are electromagnets; and a generator supplying power to said electromagnets.

3. A vessel for operation in an ionic media comprising: a hull enclosure; said hull comprising a plurality of spaced apart electrodes, a plurality of intermediate and oppositely oriented magnetic poles, and insulation between said electrodes and said magnetic poles, alternate of said electrodes being formed from different materials such that an E.M.F. is developed by cell action when said hull is placed in an ionic media which cuts lines of magnetic flux as between adjacent magnetic poles, thereby propelling said ionic media and reactively moving said hull.

4. A hull surface for self generation of propulsive force in an ionic media comprising: at least a pair of spaced apart electrodes, said electrodes being formed of different materials capable in an ionic media as an electrolyte of creating a cell action and an E.M.F. therebetween; alternating magnetic poles between said electrodes whereby flux lines are cut at right angles to said E.M.F. thereby providing propelling thrust and laminar fluid flow at the interphase between hull surface and ionic media; and insulation separating said magnets and said electrodes each from the other.

5. The combination as set forth in claim 4 and including an electrical generator for increasing the field force of said magnetic poles.

References Cited in the file of this patent

UNITED STATES PATENTS

| | | |
|---|---|---|
| 622,474 | Hoskin | Apr. 4, 1899 |
| 2,686,474 | Pulley | Aug. 17, 1954 |
| 2,756,678 | Collins | July 31, 1956 |